Nov. 6, 1934.  C. BRADLEY  1,979,249
PNEUMATIC INNER TUBE
Filed Aug. 23, 1933
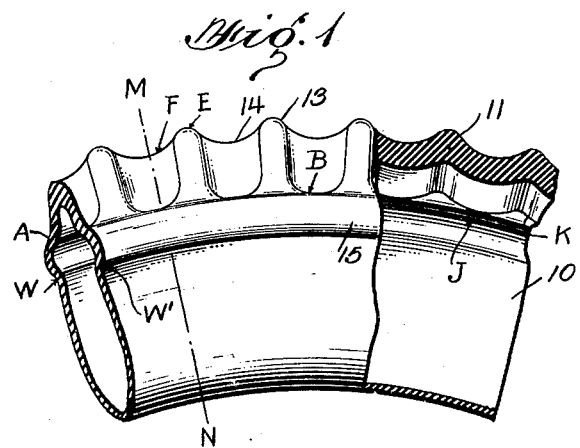
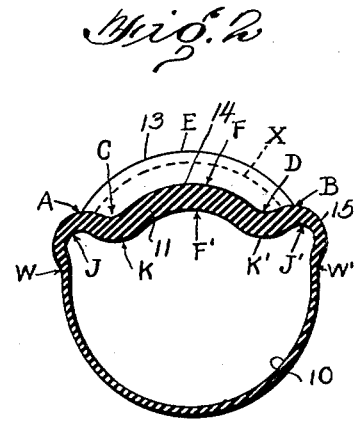
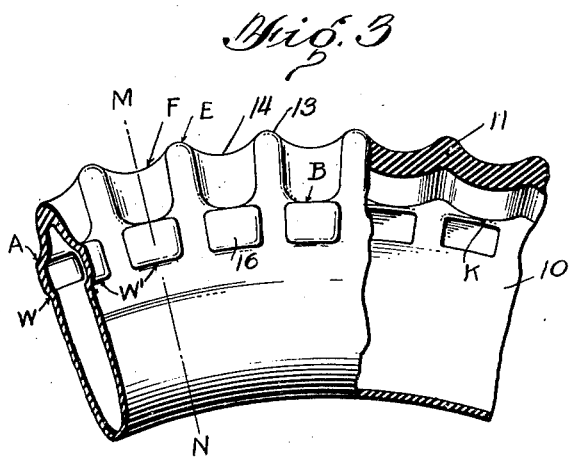
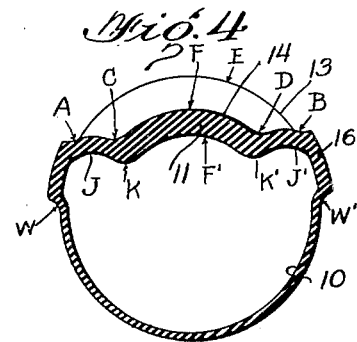
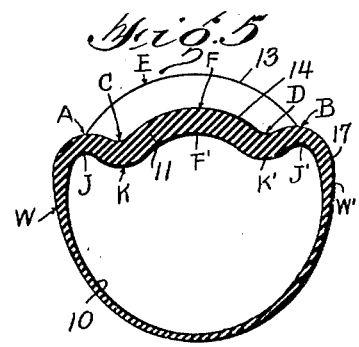
Inventor
Constantine Bradley
By Watts T. Estabrook
his Attorney Patented Nov. 6, 1934

1,979,249

UNITED STATES PATENT OFFICE 1,979,249

PNEUMATIC INNER TUBE

Constantine Bradley, Nashville, Tenn.

Application August 23, 1933, Serial No. 686,459

7 Claims. (Cl. 152—13)

My invention relates to an improvement in inner tubes and is a continuation in part of my application filed in the United States Patent Office on August 4, 1930, bearing Serial No. 472,928 which matured as Patent 1,924,148 on August 29, 1933.

This invention is an improvement on the construction illustrated in my companion application wherein provision is made for greater compression transversely of the tube throughout the depressed portions; for the more readily seating of the depressed portions against the inner periphery of a tire casing; and to permit of the use of the inner tubes in tire casings of more varied cross-sectional areas.

The invention consists in providing annular beads in the walls of the inner tube and circumferentially thereof which are preferably located at or adjacent to the ends or extremities of the depressions. Instead of annular beads, buttons or projections may be formed in the walls of the tube circumferentially thereof. With these features a greater fullness is given to the depressions or the cross-sectional periphery of the tube, which insures the depressed portions to have a sufficient amount of material to maintain them in a state of compression transversely and circumferentially when the tube is inflated within a tire casing. Furthermore, it makes it possible to manufacture the tube more cheaply, expeditiously and with less skill than the construction set forth in my earlier application.

In the accompanying drawing:

Fig. 1 is a view in elevation of a portion of a deflated inner tube showing the invention;

Fig. 2 is a vertical sectional view on line M—N of Fig. 1;

Fig. 3 is a view in elevation of a portion of a deflated inner tube showing a modified form of enlargement or button;

Fig. 4 is a vertical sectional view on line M—N of Fig. 3, and

Fig 5 is a vertical sectional view of another form of enlargement or bead.

In my copending application, of which the present application is a continuation in part, the invention resides, briefly, in forming the tread portion of an inner tube of thicker rubber than the main body portion and to provide the tread portion with transverse raised and depressed portions. The transverse raised portions 13 conforming approximately to and lying approximately against the inner surface of the tread portion of a tire casing upon the inner tube being introduced therein prior to inflation. The depressed portions 14, or indentations, are out of contact with the inner surface of the tread portion of the casing while the inner tube is deflated, but upon inflating the inner tube the depressed portions will be forced outwardly toward the inner surface of the tire casing and seat, or approximately seat, against the inner surface of the tread portion of the casing. The cross-sectional contour of the depressed portions when in a deflated state, being of a curvature equal or approximately equal to the length of a line drawn along a transverse raised portion of the tread of the tube, and of greater length than a straight line or arc connecting the outer extremities or ends of the depression, so that when the inner tube is inflated within the tire casing the tread portion of the inner tube will be in a state of compression. The depressed portions of the inner tube are provided with sufficient material or fullness, that upon the inflation of the inner tube within a tire casing the tread portion thereof will not be stretched or distended, but will lie normally or in a state of compression within the casing. The invention as disclosed in my copending application will be generally understood by reference to Figs. 1 and 2, wherein the line AC plus the arc CFD plus the line DB, representing a cross-sectional view of a depression 14, are equal or approximately equal to the arc AEB, and if the rubber in the tread 11 is formed of uniform thickness the line JK plus the arc KF'K' plus the line K'J', which is the inner surface of a depression 14, would be equal to the dotted arc AXB in Fig. 2, and the depressed portion upon being inflated would lie normally in the arc AEB, which represents a raised portion 13, and lies against or approximately against the inner surface of a tire casing in which the tube would be used.

In making the inner tubes in accordance with the disclosure in my copending application, it was found that some of the operators were not as skilled as others, and there was a tendency toward carelessness in the tubing of the tube and molding operation, causing the depressions to be formed without a uniform thickness, and producing enlargements, which tended to defeat the purpose and object of the invention, such as reducing the state of compression of the depressions when the tube was inflated. That is, when the depressed portion 14 is inflated so that its outer surface would lie in the arc AEB, the contour of such depression ACFDB would be distended to some extent and thereby reduce the state of compression of the depression when the tube is inflated.

To overcome this objection and making it possible to manufacture the tire more cheaply and expeditiously, as well as eliminating the possibility of carelessness on the part of the operator in tubing the inner tube and in the molding operation; acquiring a greater fullness of the depressed portions whereby the depressed portions are caused to rise and seat more readily upon the tube being inflated within a casing; and providing the tread portion of the tube with a sufficient amount of additional material or rubber as to place the tread portion in compression in cross-section as well as circumferentially when the tube is inflated without distending the rubber of the depressed portion, is the purpose and object of the present invention.

The inner tube 10, is constructed of suitable elastic material such as employed in the manufacture of such tubes used in connection with outer casings of automobiles and the like. The tread portion 11 of the tubes is preferably made of thicker rubber than the main body or remainder of the tube 10, and is provided in its surface with transverse raised portions 13 and depressions 14, alternately arranged circumferentially of the inner tube. It is not intended to be specifically limited to the size, shape or depth of the raised and depressed portions or their arrangement, but that they may be adapted in a manner most suitable in obtaining the desired compressed state of the tread portion of the tube with respect to the inner surface of the outer casing.

The inner tube is preferably constructed with the tread surface thereof of greater circumferential length than the circumferential length of the inner surface of a tire casing with which the tube is to be used.

In Figs. 1 and 2 an annular bead 15 is formed on each wall of the tube 10, and preferably of thicker rubber content than the main body or side walls of the tube. This annular bead is preferably arc-shaped and is formed either as a part of the thickened tread 11 of the tube, or as a part of the wall of the tube and adjacent to the sloping walls of the tread portions where it joins with the side walls of the tubes. As shown the exterior surface of the bead is convex, while the interior surface is concave. These beads located on each side wall of the tube 10 provide additional fullness in the cross-sectional perimeter of the tube since the arcs from W to A and B to W' (Fig. 2) are greater than continuation of the arc AEB from the points W to A and B to W', or from an arc WAEBW'. This additional fullness coming at or near the ends of the depressions 14 have a tendency, upon a tube being inflated in a casing, to throw more rubber into the depressions and thereby causing them to rise and seat more readily against the inner periphery of the casing upon the tube being inflated within a casing, and said beads so formed, throw a sufficient amount of additional rubber into the tread portion, including the raised portions 13, of the tube as to place said tread portion of the tube in compression in cross-section. This additional fullness in cross-section will compensate for variations in the cross-section areas of the casings in which the tube is to be used making it practical to use the tube in casings of more varied cross-sectional area than would otherwise be the case.

In Figs. 3 and 4 beads or buttons 16 are formed in a like manner to the beads 15 shown in Figs. 1 and 2, while the bead 17 shown in Fig. 5 comes out from the end of the depression 14 in an arc and on its lower side tapers into the main body or side wall of the tube 10. The purpose and object of these modified forms shown in Figs. 3, 4 and 5, are capable of the same use and accomplish the same results as that set forth with respect to the bead 15 of Figs. 1 and 2.

It is not intended to limit the invention to the shape, depth or size of the beads or buttons, or their exact location with relation to the ends of the depressions, since the depths, shapes and sizes of the beads of the tubes, and the shape of the depressions of the tube will depend upon the size of the tubes and the amount of fullness desired to be added to the cross-sectional perimeter of the tubes.

Referring to Fig. 2, the arc AEB will illustrate the position taken by the tread portion of the inner tube and the depressed portions 14 upon the inner tube being inflated in a casing, while the dotted line AXB will indicate the inner periphery of the depression. Therefore, the line AC, the arc CFD, and line DB will coincide with the arc AEB. The tread portion 11, upon the inner tube being inflated within a casing, will lie normally in cross-section along the arc AEB, which represents the inner surface of the tread portion of the casing.

The line AC represents one end of the depression and line BD represents the other end of the depression. The line CFD represents the bottom or trough of the depression. Points A and B represent the outer extremities of the ends of the depression and points C and D represent the inner extremities of the ends of the depression. The arc AEB represents a raised portion. It will be observed that the inner extremities of the ends, C and D, lie below a straight line AB, connecting the outer extremities of the ends, A and B. Also that the bottom or trough of the depression CFD lies above a straight line CD, connecting the inner extremities of the depressions, C and D. It will also be noted that the curved lines AC and BD, representing the cross-sectional view of the ends of the depression, lie in different directions from the curved line CFD, representing the cross-sectional view of the bottom or trough of the depression, and as a result the line ACFDB has greater length than a straight line AB or a continuous curved line AFB, connecting the outer extremities of the ends of the depression, A and B.

The tread of the tube is provided with additional fullness by the enlargements, beads or buttons 15, 16, 17, Figs. 1 to 5, wherein the arc WA, line AC, arc CFD, line DB, and arc BW' represent the depressed portion 14, affording sufficient fullness thereof, that upon inflation, it will assume the arc AEB of the inner surface of the tire casing, and be in a state of compression circumferentially and transversely or in cross-section, of the tube.

The beads or buttons 15, 16, 17 providing additional fullness to the raised portions 13, so that they are likewise in a state of compression circumferentially and transversely of the tube. Therefore, the entire tread portion of the tube upon inflation, is in a state of compression circumferentially and transversely of the tube.

By reason of the depressions 14, the perimeter or tread portion of the inner tube, which is composed of the depressions 14 and raised portions 13, contains a greater amount of material and has a greater circumferential length throughout the length of the tread portion thereof than the inner surface of the tread portion of an outer casing, so that upon the inner tube being inflated the depressed areas 14 will be forced outwardly against the inner surface of the tread portion of the tire casing, carrying therewith the additional fullness of the beads or buttons 15, 16, 17, which will cause the tread portion of the inner tube to become in a compressed state circumferentially and transversely of the tread. Therefore, should the tread portion of the inner tube be punctured while the tube is inflated, the opening or puncture will be automatically closed or sealed by reason of the compressed condition of the tread portion of the inner tube.

I claim:

1. An inner tube for pneumatic tires comprising an endless tubular member of elastic material, the outer periphery or tread portion of which is made up of raised portions and depressions lying transverse of the tread throughout the tread portion, the contour of each deflated depression being of a curvature substantially equal to the length of a line drawn along a transverse raised portion of the tread of the tube, and raised beads or buttons formed in the walls of the tubular member and lying circumferentially of the tread portion of the tube adjacent the ends of the depressions, said beads or buttons creating a fullness at the ends of the depressions upon the inflation of the tube and causing the depressions to seat readily within a tire casing.

2. An inner tube for pneumatic tires comprising an endless tubular member of elastic material, the outer periphery or tread portion of which is made up of raised portions and depressions lying transverse of the tread throughout the tread portion, the contour of each deflated depression being of a curvature substantially equal to the length of a line drawn along a transverse raised portion of the tread of the tube, and raised beads or buttons formed in the walls of the tubular member and lying circumferentially of the tread portion of the tube adjacent the ends of the depressions, said beads or buttons creating a fullness at the ends of the depressions and raised portions upon the inflation of the tube and causing the depressions to seat readily within a tire casing and the tread portion of the inner tube to be in a state of compression circumferentially and transversely of the tube.

3. An inner tube for pneumatic tires comprising an endless tubular member of elastic material, the outer periphery or tread portion of which is made up of raised portions and depressions lying transverse of the tread throughout the tread portion, the contour of each deflated depression being of a curvature substantially equal to the length of a line drawn along a transverse raised portion of the tread of the tube, and raised beads formed in the walls of the tubular member and lying circumferentially of the tread portion of the tube adjacent the ends of the depressions, said beads creating a fullness at the ends of the depressions upon the inflation of the tube within a tire casing and causing the tread portion of the inner tube to be in a state of compression circumferentially and transversely of the tube.

4. An inner tube for pneumatic tires, comprising an endless tubular member of elastic material, the outer periphery or tread portion of which is made up of transverse raised and depressed portions throughout the tread portion, the contour of each deflated depressed portion being of a length substantially equal to the length of a line drawn along a transverse raised portion, and raised beads or buttons formed in the walls of the tubular member and lying circumferentially of the tread portion of the tubular member adjacent the ends of the depressed portions, said beads providing an additional amount of rubber at the ends of the depressed portions to prevent distention of the depressed portions upon inflation of the tubular member within a casing and causing the tread portion of the tubular member to be in a state of compression.

5. An inner tube for pneumatic tires, comprising an endless tubular member of elastic material, the outer periphery or tread portion of which is made up of transverse raised and depressed portions throughout the tread portion, the contour of each deflated depressed portion being of a length substantially equal to the length of a line drawn along a transverse raised portion, and raised beads or buttons formed in the walls of the tubular member and lying circumferentially of the tread portion of the tubular member adjacent the ends of the depressed and raised portions, said beads providing an additional amount of rubber at the ends of the depressed and raised portions to prevent distention of the depressed portions upon inflation of the tubular member within a casing and causing the tread portion of the tubular member to be in a state of compression.

6. An inner tube for pneumatic tires, comprising an endless tubular member of elastic material, the outer periphery or tread portion of which is made up of transverse raised and depressed portions throughout the tread portion, the contour of each deflated depressed portion being of a length substantially equal to the length of a line drawn along a transverse raised portion, and raised beads or buttons formed in the walls of the tubular member and lying circumferentially of the tread portion of the tubular member adjacent the ends of the depressed portions, said beads or buttons providing an additional amount of rubber at the ends of the depressions and preventing distention of the tread portion, including the raised and depressed portions and beads or buttons, and causing the tread portion to be in a state of compression.

7. An inner tube for pneumatic tires, comprising an endless tubular member of elastic material, the outer periphery or tread portion of which is made up of transverse raised and depressed portions throughout the tread portion, the contour of each deflated depressed portion being of a length substantially equal to the length of a line drawn along a transverse raised portion, and raised beads or buttons formed in the walls of the tubular member and lying circumferentially of the tread portion of the tubular member adjacent the ends of the depressed portions, said beads or buttons providing an additional amount of rubber at the ends of the depressed portions, so that the contour of said depressed portions including the beads or buttons is of greater length than the length of a line drawn along a transverse raised portion thereby causing the depressed portions upon inflation of the tubular member to assume a position in a like plane of the raised portions and the tread portion to be in a state of compression transversely and circumferentially of the tubular member.

CONSTANTINE BRADLEY.